United States Patent
Cho et al.

(10) Patent No.: US 11,971,730 B2
(45) Date of Patent: Apr. 30, 2024

(54) AUTOMATED ASSIGNMENT OF UAVS TO STAGING PADS

(71) Applicant: WING Aviation LLC, Mountain View, CA (US)

(72) Inventors: Reia Cho, San Francisco, CA (US); Kevin Jenkins, Dallas, TX (US); Damien Jourdan, San Jose, CA (US)

(73) Assignee: WING Aviation LLC, Mountain View, CA (US)

(*) Notice: Subject to any disclaimer, the term of this patent is extended or adjusted under 35 U.S.C. 154(b) by 1 day.

(21) Appl. No.: 17/521,574

(22) Filed: Nov. 8, 2021

(65) Prior Publication Data

US 2023/0141818 A1 May 11, 2023

(51) Int. Cl.
| | |
|---|---|
| *G05D 1/10* | (2006.01) |
| *B64C 39/02* | (2023.01) |
| *B64U 70/00* | (2023.01) |
| *B64U 101/30* | (2023.01) |
| *G05D 1/00* | (2006.01) |
| *G05D 1/06* | (2006.01) |
| *G06Q 10/02* | (2012.01) |
| *G06V 10/22* | (2022.01) |
| *G06V 20/10* | (2022.01) |

(52) U.S. Cl.
CPC ........... *G05D 1/101* (2013.01); *B64C 39/024* (2013.01); *G05D 1/0676* (2013.01); *G06Q 10/02* (2013.01); *G06V 10/22* (2022.01); *G06V 20/176* (2022.01); *B64U 70/00* (2023.01); *B64U 2101/30* (2023.01); *B64U 2201/10* (2023.01)

(58) Field of Classification Search
CPC .... G05D 1/101; G05D 1/0676; B64C 39/024; G06Q 10/02; G06V 10/22; G06V 20/176; B64U 70/00; B64U 2101/30; B64U 2201/10
See application file for complete search history.

(56) References Cited

U.S. PATENT DOCUMENTS

| | | | |
|---|---|---|---|
| 9,540,102 | B2 | 1/2017 | Levien et al. |
| 10,351,239 | B2 | 7/2019 | Di Benedetto et al. |
| 10,377,507 | B2 | 8/2019 | Tremblay et al. |
| 11,027,858 | B2 | 6/2021 | De Benedetto et al. |
| 2018/0025650 | A1 | 1/2018 | Taveira |

(Continued)

OTHER PUBLICATIONS

International Search Report and Written Opinion, dated Dec. 2, 2022, in corresponding International Patent Application No. PCT/US2022/042744, 14 pages.

*Primary Examiner* — Anne Marie Antonucci
*Assistant Examiner* — Jewel Ashley Kuntz
(74) *Attorney, Agent, or Firm* — CHRISTENSEN O'CONNOR JOHNSON KINDNESS PLLC (57) ABSTRACT

A method for automated assignment of a staging pad to an unmanned aerial vehicle (UAV) includes: launching the UAV from a launch location; tracking a drift of the UAV from the launch location; determining a subsequent position of the UAV after the launching based upon geofiducial navigation; calculating an estimated position of the launch location by offsetting the subsequent position by the drift; attempting to match the estimated position to an available staging pad of a plurality of staging pads; and assigning the UAV to the available staging pad when the estimated position successfully matches to the available staging pad.

22 Claims, 7 Drawing Sheets

(56) References Cited

U.S. PATENT DOCUMENTS

| | | |
|---|---|---|
| 2020/0242949 A1 | 7/2020 | Eyhorn |
| 2020/0301445 A1* | 9/2020 | Jourdan ................ B64U 30/20 |
| 2021/0107682 A1* | 4/2021 | Kozlenko ............... B64F 1/222 |
| 2021/0284356 A1* | 9/2021 | Jourdan ................ B64U 70/80 |

* cited by examiner

AUTOMATED ASSIGNMENT OF UAVS TO STAGING PADS

TECHNICAL FIELD

This disclosure relates generally to unmanned aerial vehicles (UAVs), and in particular but not exclusively, relates to assigning staging pads to UAVs.

BACKGROUND INFORMATION

As fleets of unmanned aerial vehicles (UAVs), also referred to as drones, are enlisted for small package deliveries, aerial photography, public safety, etc., the nests from which these UAVs operate will grow to house increasing numbers of UAVs to support customer demand. The outdoor nature of many of these nests or staging areas (also referred to as "terminal areas") often requires that the fleet of UAVs are physically deployed to their staging pads each morning and collected each evening for safe overnight storage out of the elements.

Physically deploying a large fleet to staging pads each morning can be laborious. Conventionally, when deploying (e.g., physically placing) each UAV to its respective staging pad, the human operator manually assigns each UAV to a nest and a staging pad within the nest by visually inspecting the UAV identifier (e.g., tail number) and pad identifier, and then associating these identifiers in the nest manager software. This manual registration is not only time consuming, but is also a high-touch daily routine prone to human error. Incorrect pad placement that does not match the nest manager software assignment/registration can lead to cross-track errors, aborted missions, and occasionally UAV damage. Automation of this routine assignment/registration process could save time and labor while reducing the instances of aircraft damage due to human error.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method for automatically assigning/registering unmanned aerial vehicles (UAVs) to staging pads are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
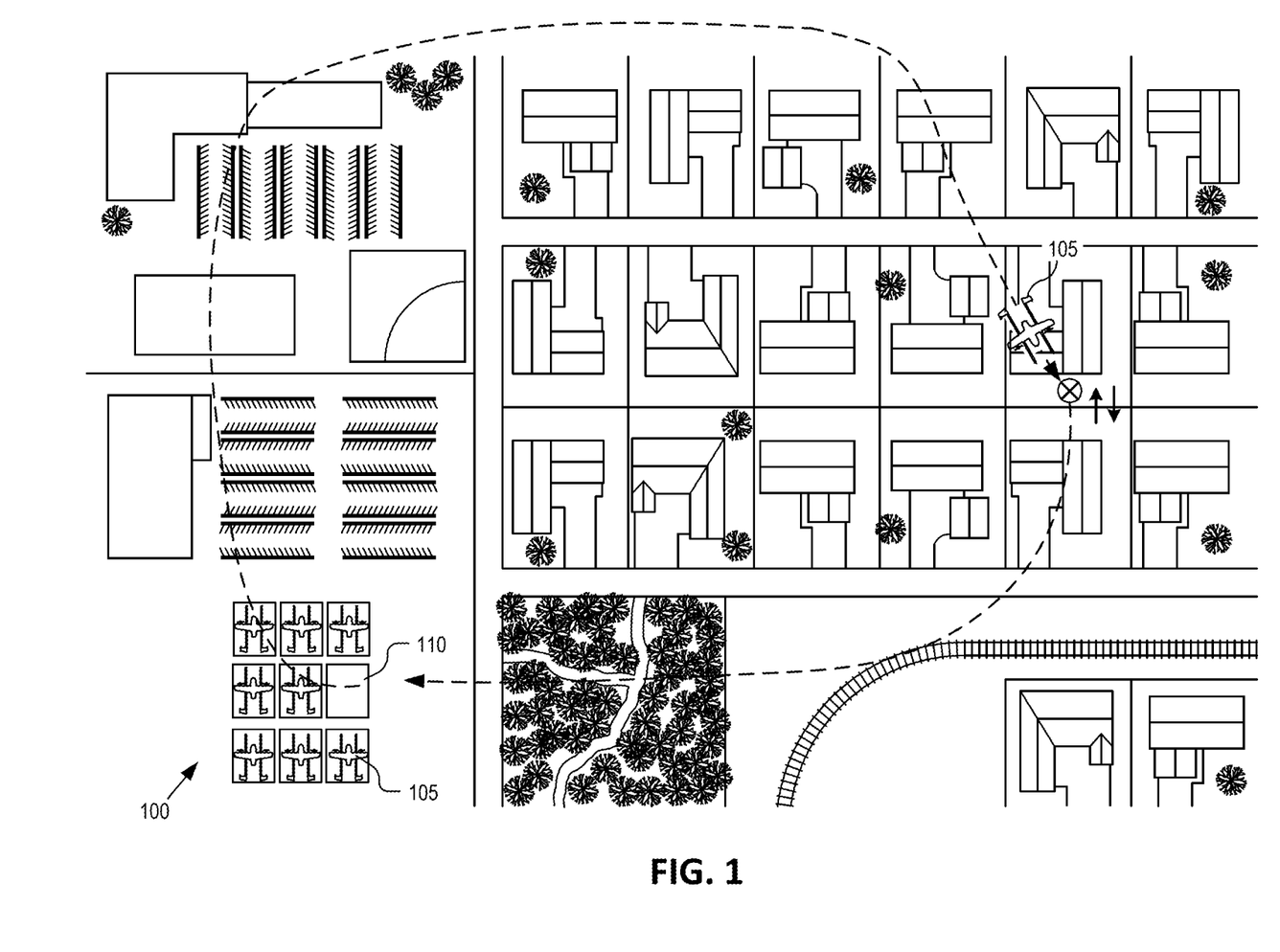
FIG. 1 illustrates a terminal area from which unmanned aerial vehicles (UAVs) are staged on a plurality of staging pads for performing UAV missions over a neighborhood, in accordance with an embodiment of the disclosure.

UAVs may be provisioned to perform a variety of different mission types, including package delivery, aerial photography, public safety, etc. These UAVs may stage from an operations facility where many UAVs operate. FIG. 1 illustrates an example terminal area 100 staging a plurality of UAVs, such as UAV 105, for servicing a nearby neighborhood. Many of these facilities are outdoor and exposed to the elements (wind, rain, lightening, subzero temperatures, snow, etc.) often requiring routine daily deployment each morning and overnight indoor storage. This process can take as much as 45 minutes or more for a large terminal area. As mentioned, daily registration/assignment of UAVs 105 to the correct staging pad 110 is time consuming and prone to human error. Staging pads 110 may represent launching pads, landing pads, charging pads, or any combination thereof.

Embodiments described herein provide a solution where UAVs 105 are more quickly deployed throughout terminal area 100 and automatically assigned to respective staging pads 110. Site operators can quickly distribute UAVs on or adjacent to staging pads 110 without need of particular attention given to UAV orientation or centering on staging pads 110. Furthermore, the registration/assignment of each UAV 105 to an available staging pad 110 in the backend management software is automated removing the human operator from much of the process, thereby saving time, costs, and reducing instances of human error in the laborious data input process of associating UAV identifiers (e.g., tail number) with staging pad identifiers (e.g., pad numbers). As UAVs are more widely adopted, UAV fleets and terminal areas 100 will grow further exasperating this problem accentuating the need for a quick, reliable, automated pad assignment technique as described herein.

Embodiments of the automated pad assignment described herein enable physical placement of UAVs 105 on staging pads 110, but automated execution of fitness test missions. These fitness test missions are assigned from the backend management system to determine each UAVs readiness to fly and enables each UAV to assign itself to an available staging pad 110 within terminal area 100. The fitness test missions may be wirelessly communicated to UAVs 105 over a local area network (e.g., WiFi), cellular network, or otherwise and include a listing of available staging pads within terminal area 100 along with the location (e.g., latitude/longitude) of each available staging pad 110. Since terminal areas 100 are often designated as global positioning system (GPS) denied areas, UAVs 105 may initially launch without true, accurate, or any knowledge of their orientation (e.g., heading) and location (e.g., latitude and longitude). GPS may be denied in terminal area 100 if it is a covered or indoor space, due to close proximity of large buildings or mountains, or other environmental factors, but may also be forcibly denied in software and deemed insufficiently accurate for reliable navigation in and around terminal area 100. Terminal area 100 is a congestion point with the presence of human operators often demanding greater navigation precision than available from civilian/commercial GPS.

A fitness test mission may include an initial test launch where UAV 105 rises straight up to a waypoint above its initial launch location (e.g., 2 m) while tracking drift from its launch location using inertial tracking and/or visual odometry. While rising to the waypoint, or after reaching the waypoint, UAVs 105 may use its onboard camera and geofiducial navigation systems to compute a geofiducial navigation solution, from which an actual or accurate heading, latitude, longitude, and altitude (referred to as a navigation solution) is determined. By offsetting the UAV's subsequent position computed based upon geofiducial navigation by the UAV's drift since launch, UAV 105 can calculate an estimated position of its launch location. This estimated position may then be used by UAV 105 to match against the list of available staging pads received from the backend management system. If a match is found, then UAV 105 can assign itself to the available staging pad and report or register the assignment to the backend management system to remove the reserved staging pad 110 from the pool of available staging pads provided to other UAVs. These and other features of the automated pad assignment technique as described in further details below.

Figure 2A:
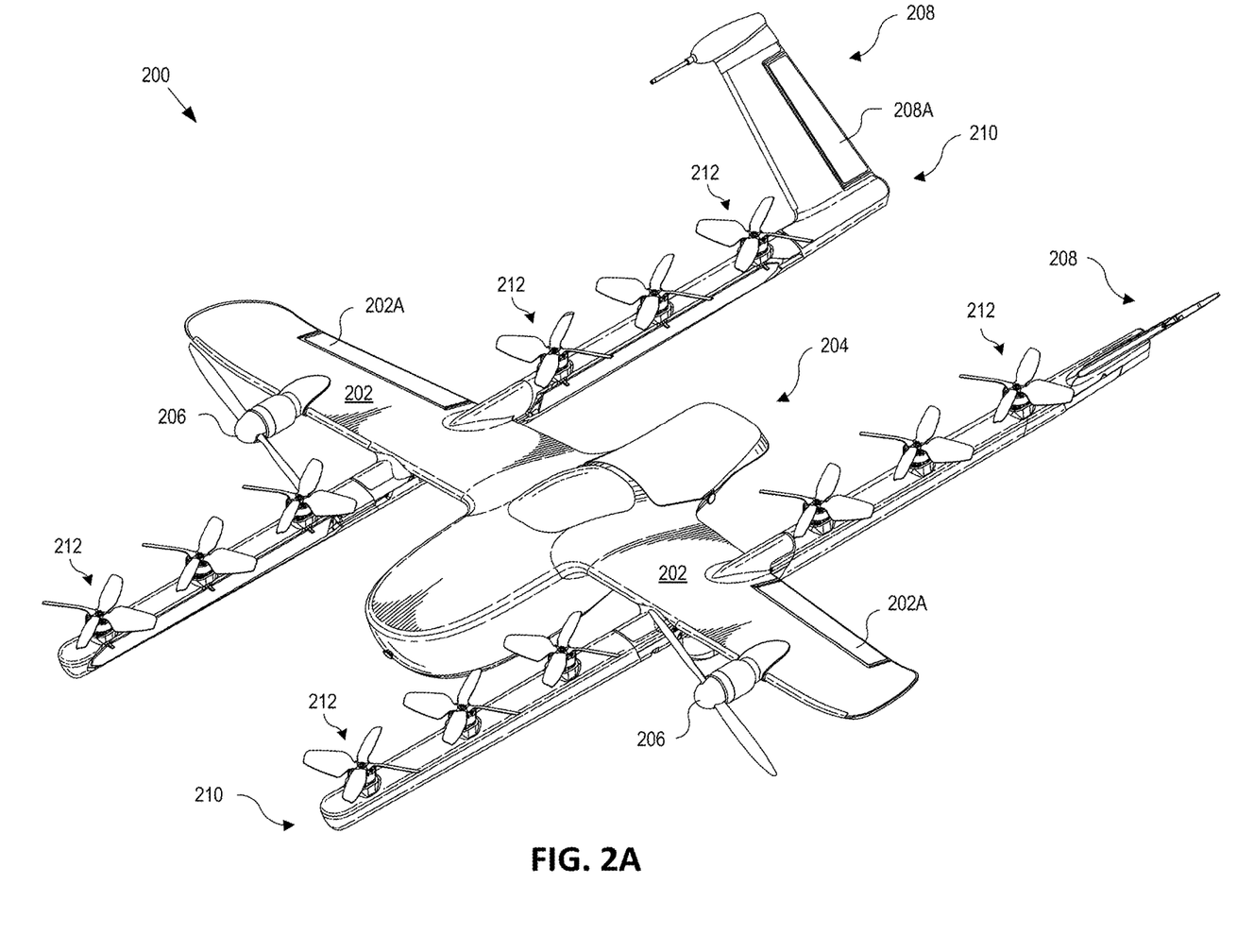
FIGS. 2A and 2B illustrate an example UAV, in accordance with an embodiment of the disclosure.
Figure 2B:
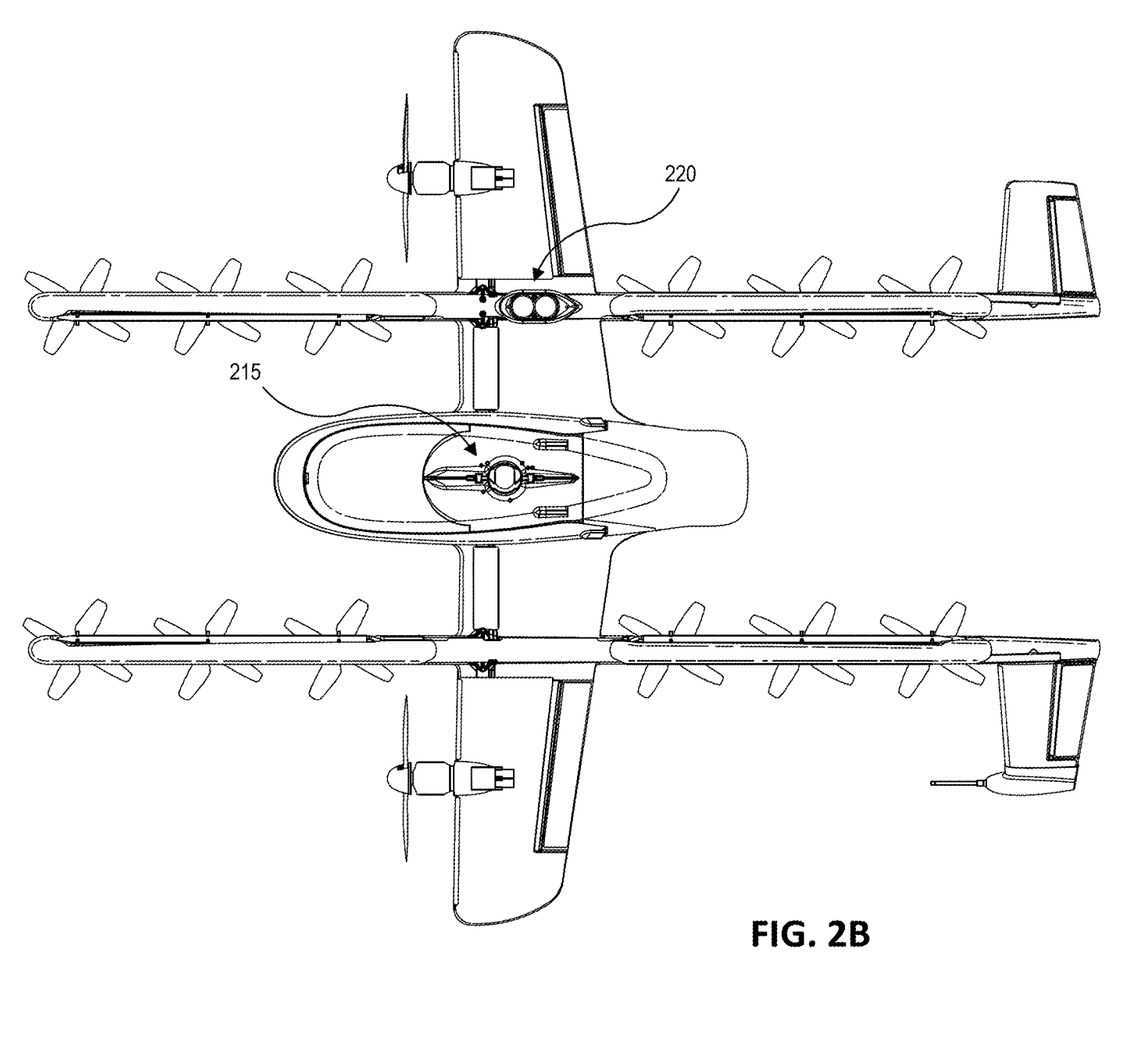

FIGS. 2A and 2B illustrate an UAV 200 that is well suited for various types of UAV missions including package delivery, aerial photography, public safety, or otherwise, in accordance with an embodiment of the disclosure. FIG. 2A is a topside perspective view illustration of UAV 200 while FIG. 2B is a bottom side plan view illustration of the same. UAV 200 is one possible implementation of UAV 105 illustrated in FIG. 1, although other types of UAVs may be implemented as well.

The illustrated embodiment of UAV 200 is a vertical takeoff and landing (VTOL) UAV that includes separate propulsion units 206 and 212 for providing horizontal and vertical propulsion, respectively. UAV 200 is a fixed-wing aerial vehicle, which as the name implies, has a wing assembly 202 that can generate lift based on the wing shape and the vehicle's forward airspeed when propelled horizontally by propulsion units 206. The illustrated embodiment of UAV 200 has an airframe that includes a fuselage 204 and wing assembly 202. In one embodiment, fuselage 204 is modular and includes a battery module, an avionics module, and a mission payload module. These modules are secured together to form the fuselage or main body.

The battery module (e.g., fore portion of fuselage 204) includes a cavity for housing one or more batteries for powering UAV 200. The avionics module (e.g., aft portion of fuselage 204) houses flight control circuitry of UAV 200, which may include a processor and memory, communication electronics and antennas (e.g., cellular transceiver, wifi transceiver, etc.), and various sensors (e.g., global positioning sensor, an inertial measurement unit, a magnetic compass, a radio frequency identifier reader, etc.). The mission payload module (e.g., middle portion of fuselage 204) houses equipment associated with a mission of UAV 200. For example, the mission payload module may include a payload actuator 215 (see FIG. 2B) for holding and releasing an externally attached payload (e.g., package for delivery).

In some embodiments, the mission payload module may include camera/sensor equipment (e.g., camera, lenses, radar, lidar, pollution monitoring sensors, weather monitoring sensors, scanners, etc.). In FIG. 2B, an onboard camera 220 is mounted to the underside of UAV 200 to support a computer vision system for visual triangulation, visual odometry, geofiducial navigation as well as operate as an optical code scanner for reading visual codes affixed to packages.

As illustrated, UAV 200 includes horizontal propulsion units 206 positioned on wing assembly 202 for propelling UAV 200 horizontally. UAV 200 further includes two boom assemblies 210 that secure to wing assembly 202. Vertical propulsion units 212 are mounted to boom assemblies 210. Vertical propulsion units 212 providing vertical propulsion. Vertical propulsion units 212 may be used during a hover mode where UAV 200 is descending (e.g., to a delivery location), ascending (e.g., at initial launch or following a delivery), or maintaining a constant altitude. Stabilizers 208 (or tails) may be included with UAV 200 to control pitch and stabilize the aerial vehicle's yaw (left or right turns) during cruise. In some embodiments, during cruise mode vertical propulsion units 212 are disabled or powered low and during hover mode horizontal propulsion units 206 are disabled or powered low.

During flight, UAV 200 may control the direction and/or speed of its movement by controlling its pitch, roll, yaw, and/or altitude. Thrust from horizontal propulsion units 206 is used to control air speed. For example, the stabilizers 208 may include one or more rudders 208a for controlling the aerial vehicle's yaw, and wing assembly 202 may include elevators for controlling the aerial vehicle's pitch and/or ailerons 202a for controlling the aerial vehicle's roll. As another example, increasing or decreasing the speed of all the propeller blades simultaneously can result in UAV 200 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIGS. 2A and 2B illustrate one wing assembly 202, two boom assemblies 210, two horizontal propulsion units 206, and six vertical propulsion units 212 per boom assembly 210, it should be appreciated that other variants of UAV 200 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 3A:
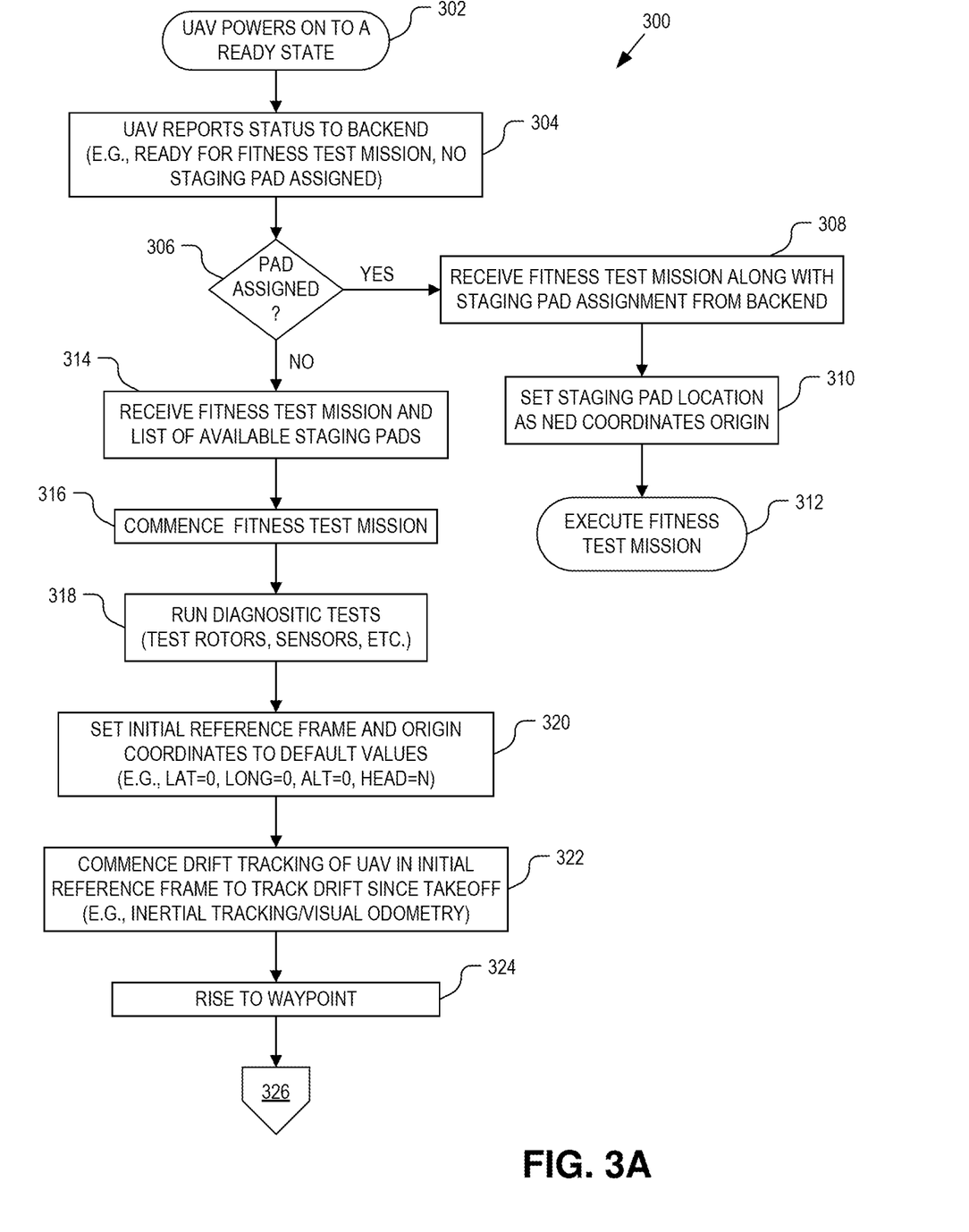
FIGS. 3A and 3B illustrate a process for automatically assigning UAVs to staging pads within a terminal area for staging the UAVs, in accordance with an embodiment of the disclosure.
Figure 3B:
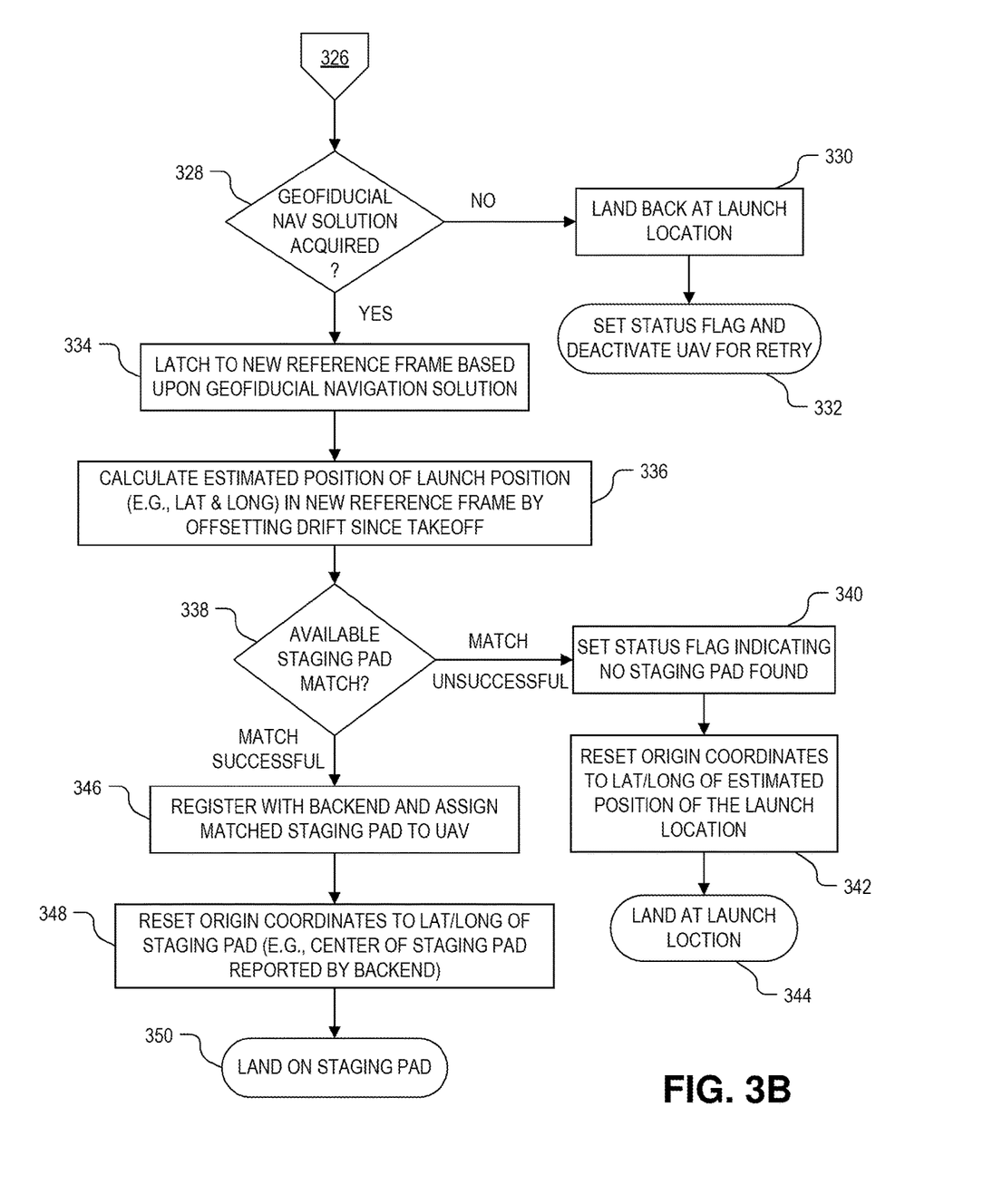

FIGS. 3A and 3B illustrate a process 300 for automatically assigning UAVs to staging pads 110 within terminal area 100, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

Figure 5:
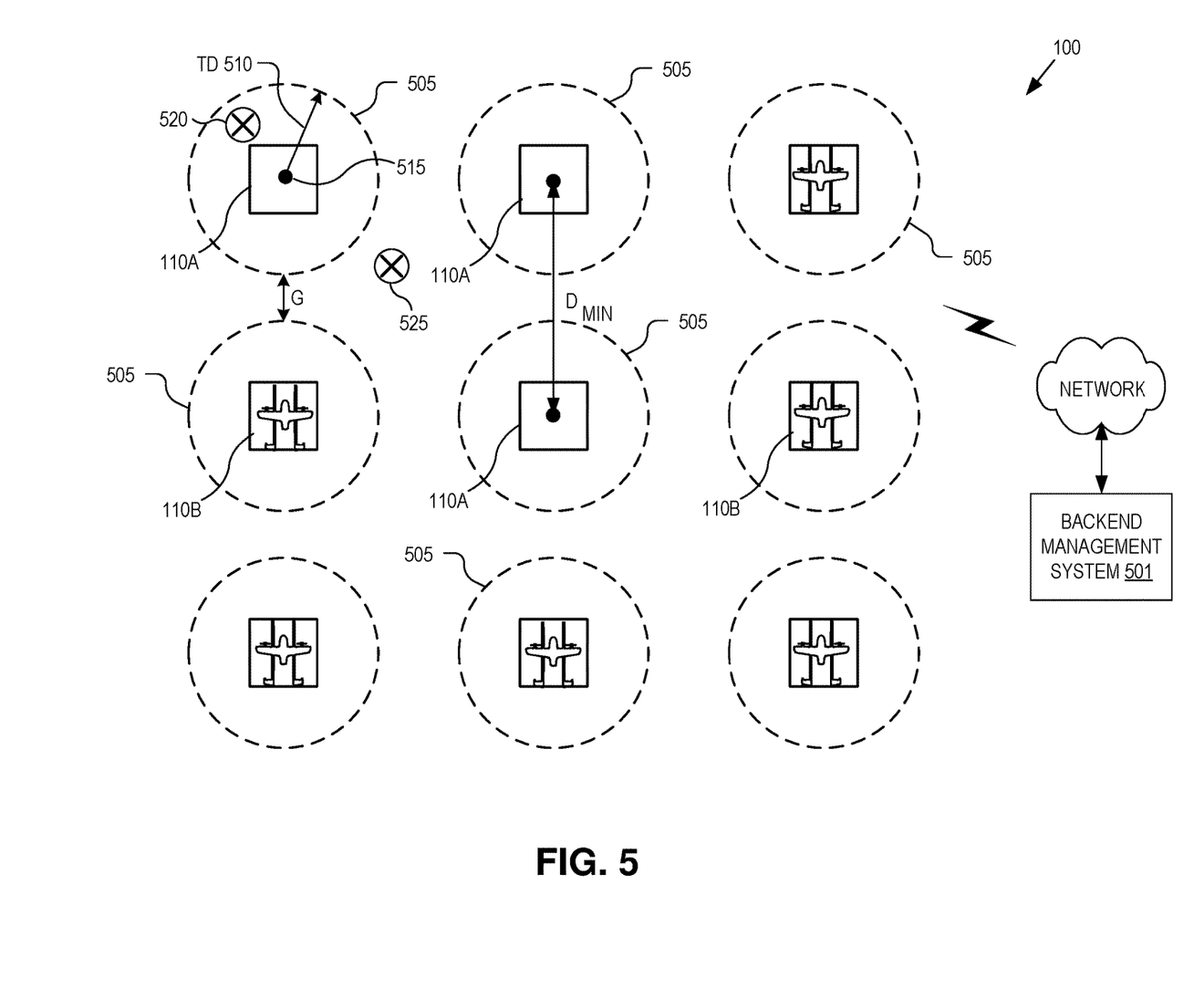
FIG. 5 illustrates an array of staging pads organized at a terminal area each having an assignment area within a threshold distance of a center of each staging pad, in accordance with an embodiment of the disclosure.

Process 300 is well suited for automated assignment of staging pads 110 to UAVs within a nest or terminal area 100 managed by a backend management system 501 (see FIG. 5). However, it is anticipated that process 300 may be adapted for automated assignment of staging pads to other types of unmanned vehicles located in other places or staging facilities than just a terminal area for UAVs. Although process 300 is described in relation to a single UAV 105, it should be appreciated that it may be repeated for automatic assignment of a fleet of UAVs.

Prior to commencement of process 300 one or more UAVs, including UAV 105, may be deployed throughout terminal area 100 to initial launch locations by various means including manual placement by an on-site technician/operator or other means of manual, semi-automated, or fully automated deployment. In the example of manual placement by a human operator, the operator need not precisely position and align UAV 105 on a staging pad 110. Rather, the initial placement need only fall within an assignment area 505 (see FIG. 5) encircling a given staging pad 110. In the embodiment illustrated in FIG. 5, assignment areas 505 are circular regions that each fall within a threshold distance (TD) 510 of a center 515 of a corresponding staging pad 110. Furthermore, the human operator need not position UAV 105 with a particular orientation or heading when physically deploying UAV 105.

Once UAV 105 has been physically deployed into terminal area 100, process 300 commences when UAV 105 is powered on to a ready state (process block 302). Upon power cycling, UAV 105 establishes a wireless communication link to backend management system 501 and reports its status (process block 304). Backend management system 501 may be a local command and control system present at terminal area 100, or a cloud-based command and control remotely linked over one or more networks. UAV 105 initially communicates with backend management system 501 to convey its readiness to receive a UAV mission. One such mission is a Fitness Test Mission, which operates as a sort of built-in-self-test where UAV 105 is instructed to cycle through a series of subsystem tests to ensure it is mission ready.

When UAV 105 initially checks in with backend management system 501, backend management system 501 will check its registry to determine whether UAV 105 already has a staging pad reservation/assignment (decision block 306). If a staging pad 110 is already assigned to the given UAV 105, then both a fitness test mission along with the assigned staging pad is communicated to UAV 105 (process block 308). In this scenario, the fitness test mission may also include the location (e.g., latitude and longitude) of the assigned staging pad. A preestablished pad assignment may exist when UAV 105 is always deployed to the same staging pad and the assignment is not cleared at the end of each day. In this scenario, UAV 105 may set the origin coordinates of its navigation coordinate system (e.g., NED coordinates) to the provided latitude and longitude of the previously assigned staging pad (process block 310) and then proceeds to execute the fitness test mission (process block 312). Alternatively, UAV 105 may simply set a waypoint for tracking to the provided latitude and longitude of the previously assigned staging pad.

Returning to decision block 306, if the registry of backend management system 501 indicates that no staging pad has yet been assigned to UAV 105, then process 300 continues to a process block 314 and communicates a fitness test mission along with a list of available staging pads to UAV 105. In process block 316, UAV 105 commences the fitness test mission without a staging pad assignment and without foreknowledge of its launch location. As mentioned above, the fitness test mission is a sort of built-in-self-test whereby UAV 105 executes a number of diagnostic tests to ensure its mission readiness. These diagnostic tests may include sensor checks, rotor pulsing, communication checks, or otherwise (process block 318).

Since backend management system 501 does not yet know where UAV 105 has been placed within terminal area 100, it is unable to inform UAV 105 of its launch location and thus the fitness test mission and initial UAV launch proceed without informing UAV 105 of its launch location. While UAV 105 may include GPS sensors, terminal area 100 is often designated as a GPS denied zone, preventing UAV 105 from navigating based solely on GPS. Due to the density of UAVs and expected presence of obstacles and human operators, commercial/civilian GPS may not be sufficiently accurate to permit UAV 105 to navigate exclusively on GPS in the vicinity of terminal area 100. Similarly, the compass heading from the onboard inertial measurement unit (IMU) may also be deemed insufficiently accurate to extract the UAV's heading. Accordingly, in a process block 320, UAV 105 sets its navigation coordinate system to an initial reference frame with origin coordinates set to default values. For example, UAV 105 may operate using North-East-Down (NED) coordinates. In this example, the origin coordinates, corresponding to its initial launch location, are set to default values (e.g., latitude=0; longitude=0; altitude=0). Similarly, the UAV's heading at launch is also set to a default value (e.g., heading=north). Thus, the navigation coordinate system may be set to an initial reference frame. One example initial reference frame may be thought of as a pseudo-NED coordinate system having the initial launch location being the origin coordinates, which are set to the default values mentioned above.

Prior to launch from staging pad 110, UAV 105 commences motion tracking (process block 322). Motion tracking may be performed using visual odometry, inertial tracking, or a combination thereof. Visual odometry is the process of determining changes in position and orientation by analyzing camera images. UAV 105 may analyze images acquired by onboard camera 220 to track its drift immediately after launch. Inertial tracking is the process of determining changes in position and orientation by analyzing outputs from the onboard IMU. For example, the IMU may include an accelerometer, gyroscope, and magnetic compass. These sensor signals may also be tracked and integrated to determine changes in position and orientation immediately after launch. In one embodiment, output from visual odometry and/or inertial tracking may be input into an Extended Kalman Filter (EKF), which generates a refined estimation of the UAV's position (latitude, longitude, altitude) and heading to track drift based upon motion tracking. It is noteworthy that changes in the UAV's position and heading are tracked in the UAV's initial reference frame or initial navigation coordinate system having the origin coordinates set to default values. In a process block 324, UAV 105 rises towards a waypoint 425 (e.g., 2 m; see FIG. 4) straight above its launch location while tracking its own drift.

Figure 4:
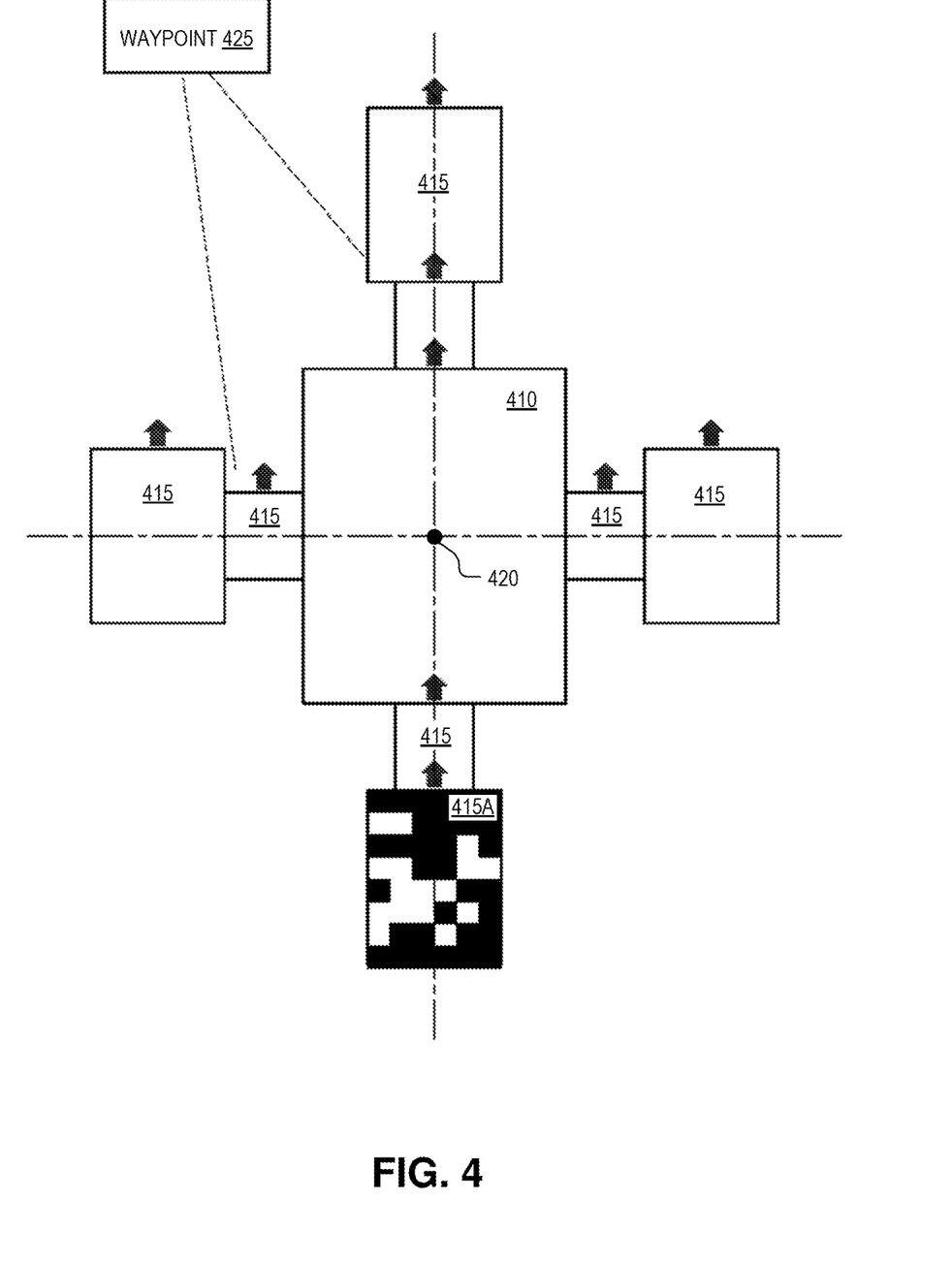
FIG. 4 illustrates a staging pad surrounded by geofiducial markers for facilitating geofiducial navigation in a GPS denied area, in accordance with an embodiment of the disclosure.

Turning to FIG. 3B (see off page reference 326), as UAV 105 rises towards waypoint 425 (or after reaching the waypoint), onboard camera 220 is used to search for one or more geofiducial markers disposed below UAV 105. The geofiducial marks are used for calculating a geofiducial navigation solution (decision block 328). FIG. 4 illustrates an example staging pad 410 surrounded by geofiducial markers 415 of varying size and offset distances from the center 420 of staging pad 410. Staging pad 410 represents an example implementation of staging pads 110. Geofiducial markers 415 may assume a variety of sizes, form factors, and designs. Geofiducial markers 415 are objects placed in the field of view (FOV) of a machine vision system and used as points of reference for calculating a geofiducial navigation solution (e.g., latitude, longitude, altitude, heading) for UAV 105. In the illustrated embodiment, one example geofiducial marker 415A is illustrated in the form of a two-dimensional barcode or quick response (QR) code. During operation, UAV 105 may store or otherwise access a registry of geofiducial codes corresponding to geofiducial markers 415, which lists the position and heading associated with the corresponding geofiducial codes. The onboard machine vision systems, including onboard camera 220, are then able to calculate the position and heading of UAV 105 relative to the known position and heading of one or more geofiducial markers 415 within its FOV.

If UAV 105 is unable to locate a geofiducial marker 415, or otherwise unable to calculate a geofiducial navigation solution (decision block 328), then UAV 105 will land back at its original launch location (process block 330) using motion tracking guidance and set a status flag indicating an unsuccessful fitness test mission (process block 332). UAV 105 may also deactivate or otherwise power cycle to reset itself in preparation for a retry of the fitness test mission and bring operator awareness to the failed fitness test mission.

However, if one or more geofiducial markers 415 have been identified by UAV 105 and it is able to generate a geofiducial navigation solution (decision block 328), then process 300 continues to a process block 334. Once UAV 105 is able to acquire a geofiducial navigation solution, it is aware of its actual position and heading, as determined from geofiducial markers 415. In process block 334, UAV 105 performs an in-air latch of its navigation coordinate system from the initial reference frame (e.g., pseudo-NED) to a new reference frame (e.g., actual-NED or just "NED") based upon the geofiducial navigation solution. In other words, once UAV 105 has computed its actual position and heading, it can reset its coordinate system to reflect its actual position and heading. In one embodiment, latching to the new reference frame includes updating the latitude, longitude, and heading of UAV 105 based upon the geofiducial navigation solution, but leaving the altitude reading unchanged. This new reference frame may be a NED reference frame having the launch location or staging pad as the origin coordinates.

Once UAV 105 has determined its actual position, it can calculate the estimated position of its launch location by offsetting a subsequent position (e.g., its current position or some other intermediate position) by the drift tracked using motion sensing since takeoff until the subsequent position (process block 336). In one embodiment, the estimated position is calculated in the new reference frame after UAV 105 has latched its navigation coordinate system to the new reference frame. Accordingly, in this embodiment, the tracked drift is first translated/converted from the initial reference frame (e.g., pseudo-NED coordinates) into the new reference frame (e.g., NED coordinates).

Described another way, once the latitude/longitude states are reset to the new reference frame, the UAV's North-East position can be used to obtain a reinitialization latitude/longitude. This assumes that a heading reset has also taken place on the same cycle, and that all information on $N_p/E_p$ (where subscript "p" indicated a pseudo-NED value from the initial reference frame) displacement/drift corresponds to the same initial heading reference. First, the $N_p/E_p$ position corresponding to the new heading is rotated. The rotation between the $N_p$ and N axes is equal to the difference in heading before and after the heading reset occurs. Therefore a position in N/E coordinates can be obtained from one in $N_p/E_p$ coordinates by the following operations:

$d_{Np} = (N_p$ position before reset$) - (N_p$ position at takeoff$)$ $d_{Ep} = (E_p$ position before reset$) - (E_p$ position at takeoff$)$ $\Psi p = $ (Heading Estimate After Reset) $-$ (Heading Estimate Before Reset)

$d_E = d_{Ep} \cos \Psi p - d_{Np} \sin \Psi P$ $d_N = d_{Ep} \sin \Psi p + d_{Np} \cos \Psi p$ Second, these offsets are negated to obtain a N/E vector that points to the estimated launch location. This vector can then be converted to a latitude/longitude from the reset NED reference frame.

Returning to FIG. 3B, UAV 105 attempts to match the estimated position of its launch location to an available staging pad in the list received from backend management system 501 (decision block 338). In one embodiment, a match may be identified by determining whether the estimated position falls within a threshold distance (TD) to an available staging pad 110. FIG. 5 illustrated this matching process. FIG. 5 illustrates an example terminal area 100 with 9 staging pads 110 including available staging pads 110A and unavailable/assigned staging pads 110B. When UAV 105 computes an estimated position 520 of its launch location that is within an assignment area 505 of an available staging pad 110A, then a match is successful. When UAV 105 computes an estimated position 525 that is outside of an assignment area 505 associated with an available staging pad 110A, then the match is unsuccessful. Assignment areas 505 may be defined by TDs 510 from pad centers 515. In one embodiment, TD 510 is defined by:

$$TD = \frac{(D_{MIN} - G)}{2},$$

where $D_{MIN}$ represents a smallest center-to-center distance between any two staging pads in terminal area 100 for staging UAVs 105 and G represents a pad assignment safety gap. The pad assignment safety gap ensures that assignment areas 505 do not overlap. An example pad assignment safety gap may be one quarter of a meter.

Returning to FIG. 3B, when no successful match is found, then UAV 105 sets a status flag indicating no match was found (process block 340), resets its origin coordinates to the latitude/longitude of the estimated position of the launch location (process block 342) and lands back at the estimated position of its launch location (process block 344). A successful match may not occur for a variety of reasons. For example, UAV 105 may not identify enough geofiducial markers 415 to established a reliable geofiducial navigation solution, the estimated position of the launch location may not fall within any pad assignment area 505, or UAV 105 may have launched from a staging pad that is still assigned to another UAV (e.g., pad assignments were not cleared from the previous day).

On the other hand, when a successful match is found with an available staging pad 110, then UAV 105 registers/reserves the matched staging pad 110 with backend management system 501 and assigns itself to the available staging pad (process block 346). After assignment of the available staging pad 110, the latitude and longitude of the origin coordinates of the navigation coordinate system used by UAV 105 are reset to the actual position of the available staging pad 110 (process block 348). This increases the likelihood that UAV 105 will land on or near to the center 515 of its assigned staging pad 110. As mentioned above, the center coordinates may be communicated to UAV 105 from backend management system 501 with the fitness test mission. Finally, in process block 350, UAV 105 lands on the now assigned staging pad 110.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for automated assignment of a staging pad to an unmanned aerial vehicle (UAV), the method comprising:
    launching the UAV from a launch location;
    autonomously tracking, by the UAV with one or more sensors disposed onboard the UAV, a drift of the UAV from the launch location while flying subsequent to the launching;
    determining, by the UAV using a machine vision system disposed onboard the UAV, a subsequent position of the UAV after the launching based upon geofiducial navigation that uses the machine vision system to automatically identify one or more geofiducial markers disposed about the launch location;
    calculating, by the UAV, an estimated position of the launch location by offsetting the subsequent position by the drift;
    attempting to match the estimated position to an available staging pad of a plurality of staging pads; and
    assigning the UAV to the available staging pad when the estimated position successfully matches to the available staging pad.

2. The method of claim 1, wherein attempting to match the estimated position to the available staging pad comprises:
    determining whether the estimated position falls within a threshold distance to the available staging pad.

3. The method of claim 2, wherein the threshold distance (TD) is defined by:

$$TD = \frac{(D_{MIN} - G)}{2},$$

where $D_{MIN}$ represents a smallest center-to-center distance between any two staging pads in a terminal area for staging the UAV and G represents a pad assignment safety gap.

4. The method of claim 1, wherein launching the UAV comprises launching the UAV without informing the UAV of its launch location within a terminal area for staging UAVs including the UAV.

5. The method of claim 1, wherein autonomously tracking the drift of the UAV from the launch location comprises tracking the drift with one or more of inertial tracking using an inertial measurement unit of the UAV or visual odometry using a camera of the UAV.

6. The method of claim 1, further comprising:
    setting origin coordinates of a navigation coordinate system used by the UAV for navigation to default values prior to the launching.

7. The method of claim 6, wherein determining the subsequent position of the UAV after the launching based upon the geofiducial navigation comprises:
    visually searching for the one or more geofiducial markers below the UAV using a camera of the machine vision system of the UAV while the UAV rises towards a waypoint height or after the UAV reaches the waypoint height;
    calculating a geofiducial navigation solution for the UAV in response to identifying the one or more geofiducial markers; and
    latching the navigation coordinate system to a new reference frame based upon calculating the geofiducial navigation solution.

8. The method of claim 7, wherein calculating the estimated position of the launch location by offsetting the subsequent position by the drift comprises:
    translating the drift into the new reference frame prior to calculating the estimated position of the launch location.

9. The method of claim 6, further comprising:
    resetting a latitude and a longitude of the origin coordinates of the navigation coordinate system to an actual position of the available staging pad in response to the estimated position successfully matching the available staging pad.

10. The method of claim 6, further comprising:
resetting a latitude and a longitude of the origin coordinates of the navigation coordinate system to the estimated position of the launch location in response to the estimated position unsuccessfully matching any available staging pad and calculating a geofiducial navigation solution for the UAV.

11. The method of claim 1, further comprising:
reporting the match to the available staging pad to a backend management system that manages operation of the UAV to reserve the available staging pad.

12. The method of claim 1, further comprising:
navigating back to, and landing at, the launch location when the attempting to match is unsuccessful; and
set a status flag indicating an unsuccessful match has occurred.

13. At least one non-transitory machine-accessible storage medium that provides instructions that, when executed by an unmanned aerial vehicle (UAV), will cause the UAV to perform operations comprising:
launching the UAV from a launch location;
autonomously tracking, by the UAV with one or more sensors disposed onboard the UAV, a drift of the UAV from the launch location while flying subsequent to the launching;
determining, by the UAV using a machine vision system disposed onboard the UAV, a subsequent position of the UAV after the launching based upon geofiducial navigation that uses the machine vision system to automatically identify one or more geofiducial markers disposed about the launch location;
calculating, by the UAV, an estimated position of the launch location by offsetting the subsequent position by the drift;
attempting to match the estimated position to an available staging pad of a plurality of staging pads; and
assigning the UAV to the available staging pad when the estimated position successfully matches to the available staging pad.

14. The least one non-transitory machine-accessible storage medium of claim 13, wherein launching the UAV comprises launching the UAV without informing the UAV of its launch location within a terminal area for staging UAVs including the UAV.

15. The least one non-transitory machine-accessible storage medium of claim 13, wherein autonomously tracking the drift of the UAV from the launch location comprises tracking the drift with one or more of inertial tracking using an inertial measurement unit of the UAV or visual odometry using a camera of the UAV.

16. The at least one non-transitory machine-accessible storage medium of claim 13, further providing instructions that, when executed by the UAV, will cause the UAV to perform further operations, comprising:

setting origin coordinates of a navigation coordinate system used by the UAV for navigation to default values prior to the launching.

17. The at least one non-transitory machine-accessible storage medium of claim 16, wherein determining the subsequent position of the UAV after the launching based upon the geofiducial navigation comprises:
visually searching for the one or more geofiducial markers below the UAV using a camera of the machine vision system of the UAV while the UAV rises towards a waypoint height or after the UAV reaches the waypoint height;
calculating a geofiducial navigation solution for the UAV in response to identifying the one or more geofiducial markers; and
latching the navigation coordinate system to a new reference frame based upon calculating the geofiducial navigation solution.

18. The at least one non-transitory machine-accessible storage medium of claim 17, wherein calculating the estimated position of the launch location by offsetting the subsequent position by the drift comprises:
translating the drift into the new reference frame prior to calculating the estimated position of the launch location.

19. The at least one non-transitory machine-accessible storage medium of claim 17, further providing instructions that, when executed by the UAV, will cause the UAV to perform further operations, comprising:
resetting a latitude and a longitude of the origin coordinates of the navigation coordinate system to an actual position of the available staging pad in response to the estimated position successfully matching the available staging pad.

20. The at least one non-transitory machine-accessible storage medium of claim 16, further providing instructions that, when executed by the UAV, will cause the UAV to perform further operations, comprising:
resetting a latitude and a longitude of the origin coordinates of the navigation coordinate system to the estimated position of the launch location in response to the estimated position unsuccessfully matching any available staging pad and calculating a geofiducial navigation solution for the UAV.

21. The method of claim 1, further comprising:
executing a navigation system of the UAV to autonomously fly the UAV towards a waypoint height after the launching,
wherein the autonomous tracking of the drift is performed while rising towards the waypoint height, while hovering at the waypoint height, or while both rising to the waypoint height and hovering at the waypoint height.

22. The least one non-transitory machine-accessible storage medium of claim 13, wherein attempting to match the estimated position to the available staging pad comprises:
determining whether the estimated position falls within a threshold distance to the available staging pad.

* * * * *

UNITED STATES PATENT AND TRADEMARK OFFICE
CERTIFICATE OF CORRECTION

PATENT NO. : 11,971,730 B2
APPLICATION NO. : 17/521574
DATED : April 30, 2024
INVENTOR(S) : Cho et al.

It is certified that error appears in the above-identified patent and that said Letters Patent is hereby corrected as shown below:

In the Claims

| Column | Line | |
|---|---|---|
| 11 | 43 | Change "The least" to -- The at least --. |
| 11 | 48 | Change "The least" to -- The at least --. |

Signed and Sealed this
Twenty-fourth Day of December, 2024

Derrick Brent
*Acting Director of the United States Patent and Trademark Office*